United States Patent [19]

Umezawa

[11] Patent Number: 4,920,408
[45] Date of Patent: Apr. 24, 1990

[54] CIRCUIT FOR SEPARATING COMPOSITE COLOR TELEVISION SIGNAL INTO LUMINANCE SIGNAL AND CHROMINANCE SIGNAL

[75] Inventor: Toshimitu Umezawa, Kazo, Japan

[73] Assignee: Kabushiki Kaisha Toshiba, Kawasaki, Japan

[21] Appl. No.: 314,773

[22] Filed: Feb. 24, 1989

[30] Foreign Application Priority Data

Mar. 2, 1988 [JP] Japan .................................. 63-48893

[51] Int. Cl.$^5$ .............................................. H04N 9/78
[52] U.S. Cl. ...................................................... 358/31
[58] Field of Search .......................................... 358/31

[56] References Cited

U.S. PATENT DOCUMENTS

| 4,661,842 | 4/1987 | Ishige et al. ............................ 358/31 |
| 4,786,963 | 11/1988 | McNeely et al. ...................... 358/31 |
| 4,851,898 | 7/1989 | Asahara ................................ 358/31 |

FOREIGN PATENT DOCUMENTS

3819010A1 6/1988 Fed. Rep. of Germany .
62-76871 4/1987 Japan .

Primary Examiner—John W. Shepperd
Assistant Examiner—James Juo
Attorney, Agent, or Firm—Cushman, Darby & Cushman

[57] ABSTRACT

A composite color television signal is delayed one horizontal line period by a first 1H-delay circuit and then applied to a first intermediate value circuit via a first bandpass filter for passing frequency components in the vicinity of the color subcarrier frequency and a first inverter on one hand and via a second bandpass filter for passing frequency components in the vicinity of the color subcarrier frequency on the other hand. The first intermediate value circuit derives components of the two input signals which have the same waveform at the same time. The output signal of the first intermediate value circuit is directly applied to a second intermediate value circuit acting like the first intermediate value circuit on one hand and via a second 1H-delay circuit and a second inverter on the other hand. A sum signal of the output signal of the first intermediate value circuit and the output of the second inverter and an inverted signal of the output signal of the second intermediate value circuit are added together to obtain a chrominance signal. The chrominance signal and the output signal of the first 1H-delay circuit are added together to obtain a luminance signal.

16 Claims, 7 Drawing Sheets

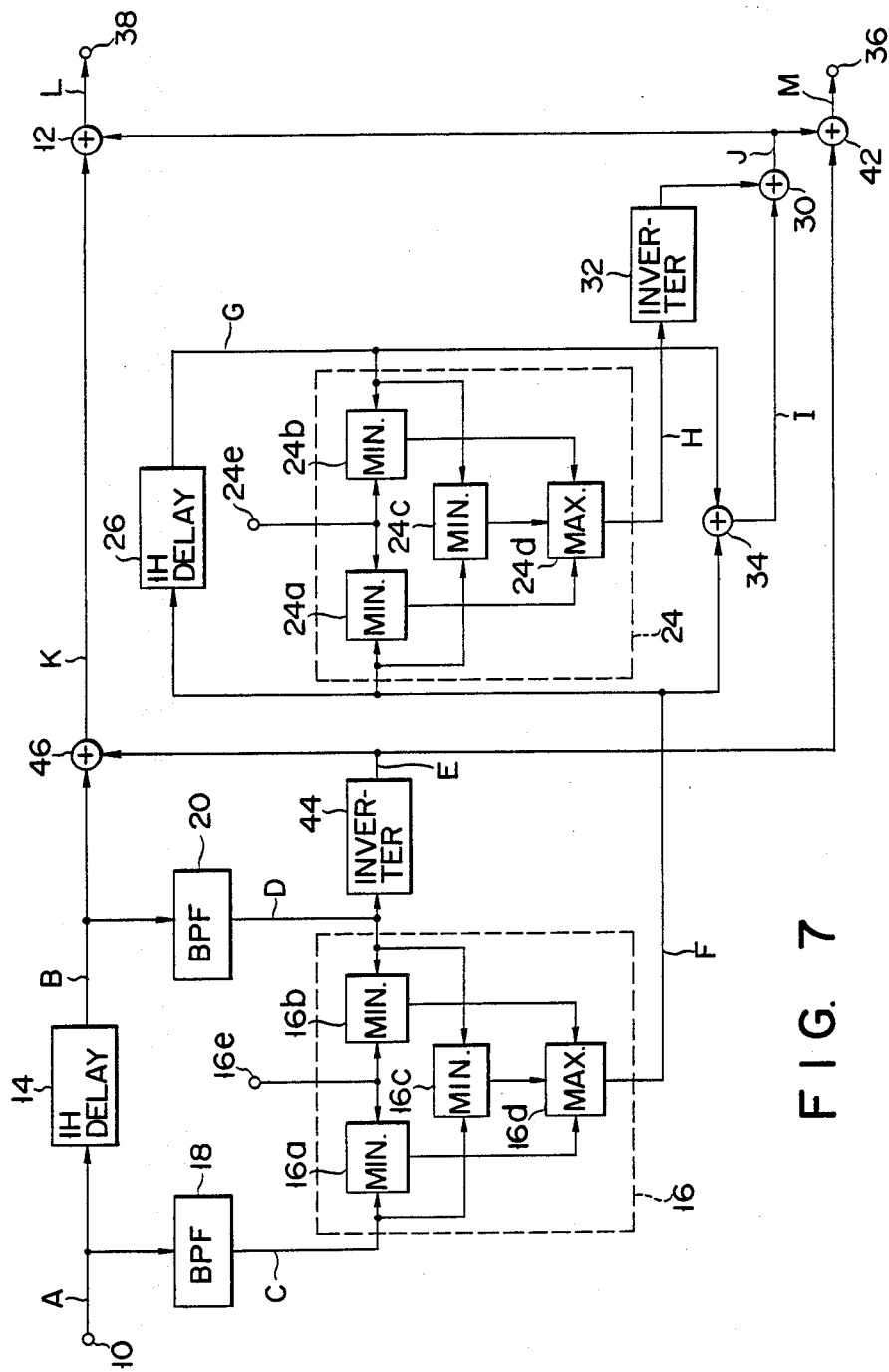
F I G. 7

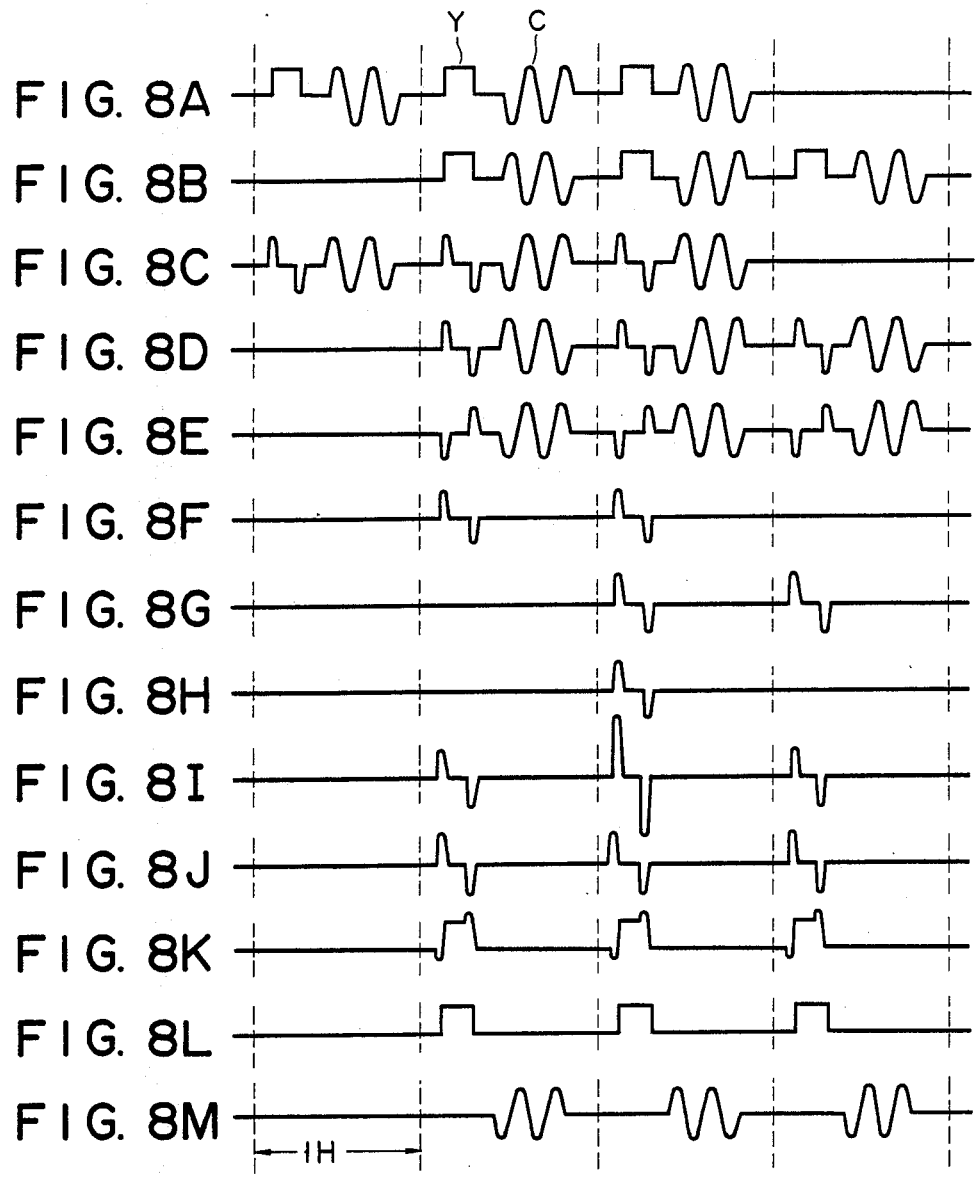

CIRCUIT FOR SEPARATING COMPOSITE COLOR TELEVISION SIGNAL INTO LUMINANCE SIGNAL AND CHROMINANCE SIGNAL

BACKGROUND OF THE INVENTION

1. Field of the Invention

The present invention relates to a luminance and chrominance signal separation circuit for separating a composite color television signal into a luminance signal and a chrominance signal which may be used in a color television receiver.

2. Description of the Related Art

As is well known, in the NTSC color system, which is one of the existing television signal transmission systems, red, green, and blue primary-color signals are combined to produce a luminance signal representing the brightness of a scene and a chrominance signal conveying information representing the hues and saturation levels of the scene, and a composite color television signal is transmitted which includes the luminance signal and chrominance signal. The luminance signal is inherently transmitted for black-and-white television receivers and the chrominance signal is required to recover the primary-color signals and, when combined with the luminance signal, reproduces correct colors on color television receivers.

In the composite color television signal, the relationship between a color subcarrier for conveying the chrominance signal, and the luminance signal is set such that no signal interference occurs, as shown in FIG. 1. That is, the chrominance signal (C), with a subcarrier of 3.579545 MHz, is inserted in the upper portion of the frequency band of the luminance signal (Y) ranging from 0 to 4.2 MHz. To recover the primary-color signals from the composite color television signal in a color television receiver, therefore, it is necessary to separate the carrier chrominance signal from the luminance signal.

There are two methods for separating the chrominance signal from the luminance signal. In the first method, the luminance signal is derived by passing the composite color television signal through a 3.58 MHz trap by which the chrominance signal is rejected, while the chrominance signal is derived by passing the composite color television signal through a bandpass filter of 3.58±0.5 MHz. The second method uses the so-called comb filter. This method utilizes the fact that in the NTSC color system the color subcarrier reverses in polarity between successive horizontal line periods (one horizontal line period is referred to hereinafter as 1H).

More specifically, the comb filter is comprised of a delay line for delaying the composite color television signal by 1H, an adder for adding the delayed composite signal and the non-delayed composite signal, a first attenuator for attenuating the output level of the adder by half, a subtracter for subtracting the delayed composite signal from the non-delayed composite signal, and a second attenuator for attenuating the output level of the subtracter by half.

Here it should be noted that the chrominance signal contained in the composite color signal during a certain horizontal line period is opposite in polarity to that during the subsequent horizontal line period. Hence the addition of the delayed composite signal and the non-delayed composite signal will cancel out the chrominance signals contained in the composite signals, but, since the luminance signal is not reversed in polarity in both the composite signals, it is not cancelled. As a result, only the luminance signal component is derived from the adder. In this case, however, the level of the luminance signal component is doubled due to addition by the adder, so the luminance signal component is halved by the first attenuator to obtain a correct luminance signal.

On the other hand, subtraction by the subtracter for the delayed and non-delayed composite signals will cancel out the luminance signal so that only the chrominance signal component passes through. In this case, subtraction by the subtracter will double the level of the chrominance signal component. The chrominance signal component is thus halved by the second attenuator to obtain a correct carrier chrominance signal.

With the conventional luminance and chrominance separation circuits using the trap and the comb filter, however, the following problems arise.

In the first method using the trap, a high-frequency components of the luminance signal as well as the chrominance signal will be eliminated. This will lead to the degradation of picture quality such as indistinctness of the details of a picture.

With the second method using the comb filter, as shown in FIG. 2, in a period of time (denoted by A) during which there is a correlation between the composite television signal (waveform a) and the 1H-delayed composite television signal (waveform b), the addition of the composite television signals will obtain the luminance signal (waveform c), from which the color sub-carrier signal is cleared, without rejecting high-frequency components of the luminance signal. However, where there is no correlation between the delayed and non-delayed composite television signals as in periods of time B and C, the chrominance signal component (designated by e) will remain in the luminance signal. As a result of this, dots will occur at the edge portions of a picture. Moreover, the luminance signal itself will be halved in amplitude level as shown at f in the periods B and C as compared with that in the period A. Hence a blunt picture will be produced which extends vertically.

In addition, the subtraction of the composite television signals in the period A during which there is a correlation between the composite television signal (waveform a) and the 1H-delayed composite television signal (waveform b) will produce the chrominance signal (waveform d) from which the luminance signal is cleared. Where there is no correlation between the composite television signals before and after 1H delay as in periods B and C, the luminance signal component (represented by g) will remain in the chrominance signal. As a result, cross color will be produced at the edge portions of a picture. Moreover, the chrominance signal itself will be reduced in amplitude level by half as compared with that in period A (refer to the portion designated by h). Hence a blunt image will be produced which extends vertically.

For the purpose of increasing the capability for separation of the luminance signal and the chrominance signal, another type of comb filter is known which performs a delay of 2H. Such a comb filter will make the drawbacks of the 1H-delay comb filter described above even more serious.

As described above, the conventional luminance and chrominance signal separation circuit which uses a trap has the problem of simultaneous elimination of high-frequency components of the luminance signal, in the attempt to eliminate the chrominance signal. Another conventional luminance and chrominance separation circuit which uses a comb filter has the problem of insufficient separation of the luminance signal and the chrominance signal in the case where composite television signals before and after 1H delay have no correlation.

SUMMARY OF THE INVENTION

It is accordingly an object of the present invention to provide a luminance and chrominance signal separation circuit which permits the elimination of a chrominance signal without eliminating high-frequency components of a luminance signal and the sufficient separation of the luminance signal and the chrominance signal even when there is no correlation between composite television signals before and after 1H delay.

According to a first aspect of the present invention, there is provided a circuit for separating a luminance signal and a chrominance signal from a composite color television signal supplied to an input terminal and outputting the luminance and chrominance signals, comprising first delay means for delaying the composite color television signal supplied to the input terminal by one horizontal line period, first extracting means for extracting frequency components in the vicinity of a color subcarrier frequency from the composite color television signal supplied to the input terminal, second extracting means for extracting frequency components in the vicinity of the color subcarrier frequency from an output signal of the first delay means, first waveform selecting means connected to receive a first signal obtained by inverting one of the output signals of the first and second extracting means and a second signal corresponding to another output signal of the first and second extracting means, for extracting only those components of the first and second signals which have the same waveform at the same time, second delay means for delaying an output signal of the first waveform selecting means by one horizontal line time, second waveform selecting means connected to receive a third signal obtained by inverting one of the output signals of the first waveform selecting means and the second delay means and a fourth signal corresponding to another output signal of the first waveform selecting means and the second delay means for extracting only those components of the third and fourth signals which have the same waveform at the same time, adder means for adding the third and fourth signals, first signal synthesizing means for performing subtraction between the output signal of the second waveform selecting means and the output signal of the adder means to obtain the chrominance signal, and second signal synthesizing means for adding the output signal of the first signal synthesizing means and the output signal of the first delay means to obtain the luminance signal.

According to a second aspect of the present invention, there is provided a circuit for separating a luminance signal and a chrominance signal from a composite color television signal supplied to an input terminal and outputting the luminance and chrominance signals, comprising first delay means for delaying the composite color television signal supplied to the input terminal by one horizontal line period, first extracting means for extracting frequency components in the vicinity of a color subcarrier frequency from the composite color television signal supplied to the input terminal to produce a first signal, second extracting means for extracting frequency components in the vicinity of the color subcarrier frequency from an output signal of the first delay means to produce a second signal, first waveform selecting means connected to receive the first and second signals from the first and second extracting means, for extracting only those components of the first and second signals which have the same waveform at the same time, producing a third signal, second delay means for delaying the third signal from the first waveform selecting means by one horizontal line time, to provide a fourth signal, second waveform selecting means connected to receive the third signal from the first waveform selecting means and the fourth signal from the second delay means for extracting only those components of the third and fourth signals which have the same waveform at the same time, adder means for adding the third and fourth signals, first subtracting means for performing subtraction between output signals of the second waveform selecting means and the adder means, second subtracting means for performing subtraction between the output signal of first delay means and the output signal of the second extracting means, first signal synthesizing means for performing subtraction between the output signal of the first subtracting means and the second signal from the second extracting means to obtain the chrominance signal, and second signal synthesizing means for adding the output signal of the first subtracting means and an output signal of the second subtracting means to obtain the luminance signal.

BRIEF DESCRIPTION OF THE DRAWINGS

FIG. 7 is a block diagram of a luminance and chrominance signal separation circuit according to a third embodiment of the present invention; and FIGS. 8A through 8M show waveforms of signals appearing at various portions of the circuit of FIG. 7.

DETAILED DESCRIPTION OF THE PREFERRED EMBODIMENTS

Figure 1:
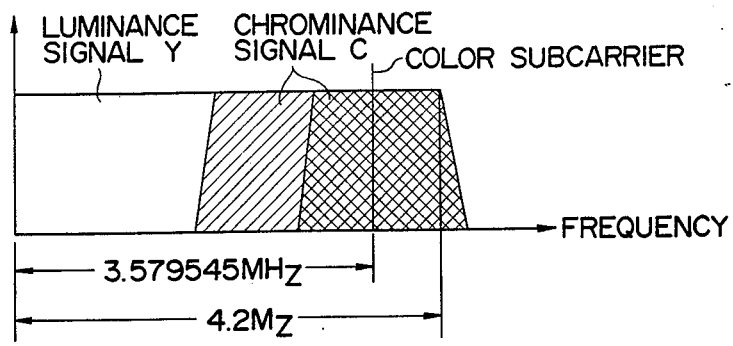
FIG. 1 shows the spectrum pattern of NTSC composite color signal.
Figure 2:
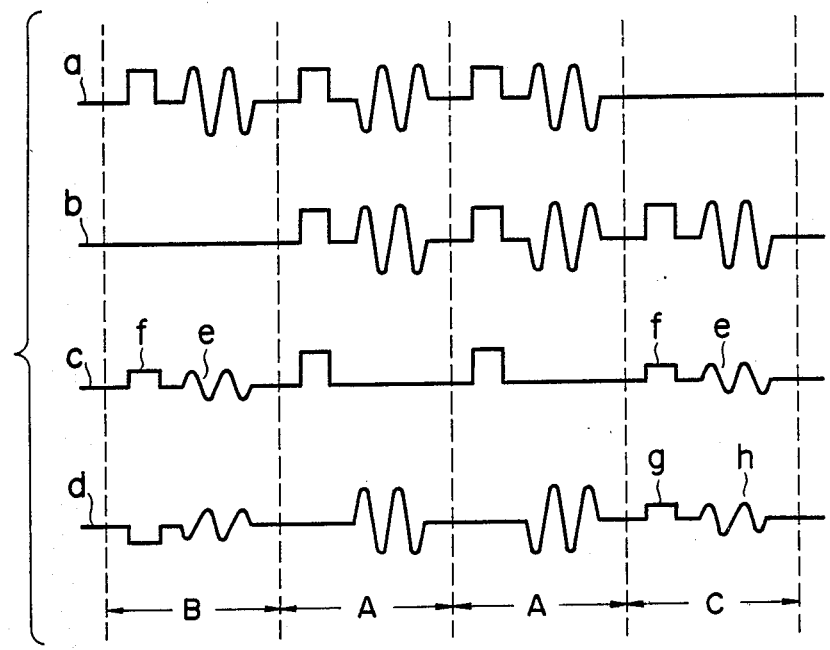
FIG. 2 is a diagram which is useful in understanding the problems of a conventional luminance and chrominance signal separation circuit using a comb filter.
Figure 3:
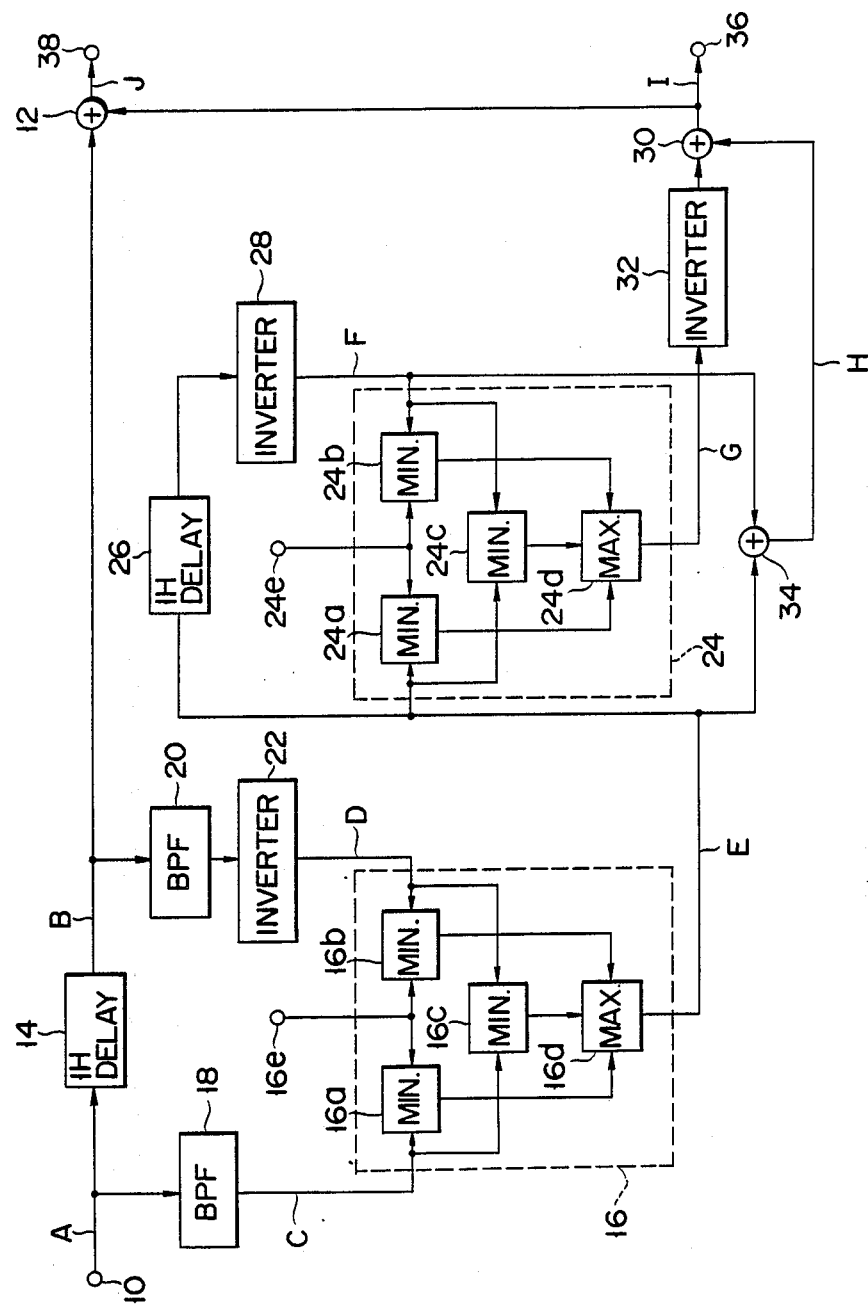
FIG. 3 is a block diagram of a luminance and chrominance signal separation circuit according to a first embodiment of the present invention.

Referring now to FIG. 3, an input terminal 10 is supplied with a composite color television signal in which a chrominance signal is superimposed on a luminance signal. The composite color television signal is in turn applied to an adder circuit 12 via a 1H-delay circuit 14 and to an intermediate value circuit 16 via a bandpass filter (BPF) 18 adapted to pass frequency components in the vicinity of the color subcarrier frequency. The composite color television signal output from 1H-delay circuit 14 is also applied to intermediate value circuit 16 via a series combination of a BPF 20, adapted to pass frequency components in the vicinity of the color subcarrier frequency, and an inverter 22.

Intermediate value circuit 16 is comprised of three minimum value (MIN.) circuits 16a, 16b and 16c and a maximum value (MAX.) circuit 16d and described in detail in copending U.S. Pat. application Ser. No. 908,654, filed Sept. 18, 1986, for "Picture-Quality Correction Circuit". Intermediate value circuit 16 provides a signal representing an intermediate value of three signals applied thereto. When two of the three signals are equal in level, intermediate value circuit 16 provides a signal of that level. In other words, when no alternating current component of the control signal is supplied to the control terminal 16e (AC=0), the circuit 16 derives those components of the signals output by BPF 18 and inverter circuit 22, which have the same waveform at the same time.

The output signal of intermediate value circuit 16 is applied to an input terminal of another intermediate value circuit 24 and to another input terminal thereof via a series combination of a 1H-delay circuit 26 and an inverter circuit 28. As is the case with intermediate value circuit 16, intermediate value circuit 24 is comprised of three minimum value (MIN.) circuits 24a, 24b, and 24c and a maximum value (MAX.) circuit 24d. Intermediate value circuit 24 thus derives components of output signals of intermediate value circuit 16 and inverter circuit 28 which become equal to each other in waveform at the same time, when no alternating current component of the control signal is supplied to the control input terminal 24e (AC=0).

The output signal of intermediate value circuit 24 is applied to an input terminal of an adder 30 via an inverter circuit 32. Output signals of intermediate value circuit 16 and inverter circuit 28 are added together in an adder 34 and then applied to the other input terminal of adder 30. The output signal of adder 30 is applied to an output terminal 36 and to the other input terminal of adder 12. The output signal of adder 12 is applied to an output terminal 38.

The operation of the circuit described above will be described with reference to the timing chart shown in FIGS. 4A through 4J, which show waveforms of signals appearing at portions A through J, respectively, of FIG. 3.

Figure 4:
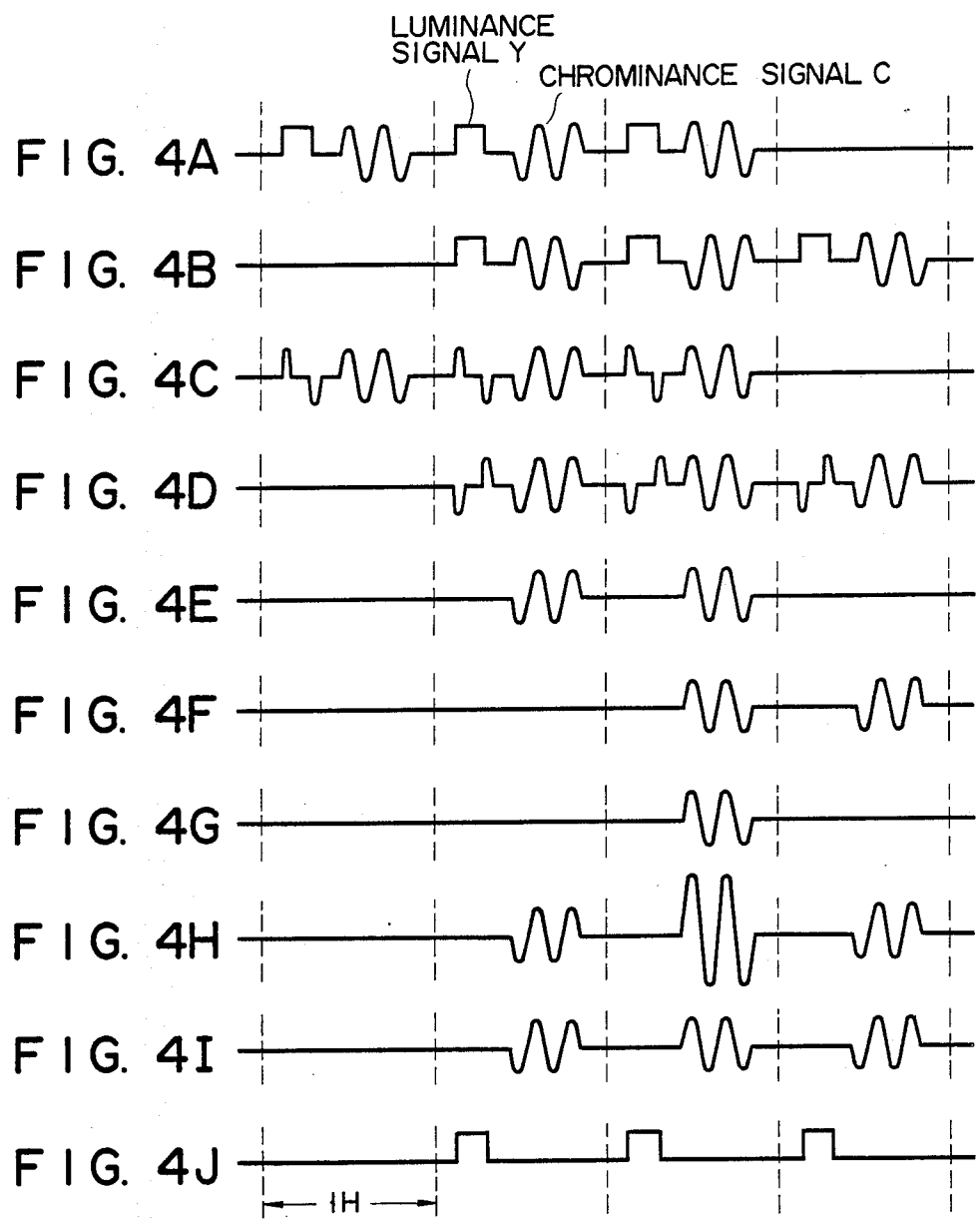
FIGS. 4A through 4J show waveforms of signals appearing at various portions of the circuit of FIG. 3.

Assume now that a composite color television signal (synchronizing signals are omitted only for the purpose of simplifying illustration) as shown in FIG. 4A is applied to input terminal 10. The composite color television signal is subjected to a delay of 1H in 1H-delay circuit 14 as shown in FIG. 4B. The composite color television signal is filtered by BPF 18 to provide a signal including high-frequency components of the luminance signal as shown in FIG. 4C. The 1H-delayed composite color signal from delay circuit 14 is subjected to filtering and inversion in BPF 20 and inverter circuit 22 to provide a signal as shown in FIG. 4D. The output signals of BPF 18 and inverter circuit 22 are applied to intermediate value circuit 16. Since control terminal 16e of intermediate value circuit 16 is set such that AC=0 as described above, intermediate value circuit 16 derives portions of equal waveform from the waveforms of FIGS. 4C and 4D to provide a signal of such a waveform as shown in FIG. 4E.

The output signal of intermediate value circuit 16 is delayed by 1H in 1H-delay circuit 26 and then inverted in inverter circuit 28 to provide such a signal as shown in FIG. 4F. The output signals of intermediate value circuit 16 and inverter 28 are applied to intermediate value circuit 24 to derive components of equal waveform which occur simultaneously as shown in FIG. 4G. The output signals of intermediate value circuit 16 and inverter 28 are added together in adder 34 to provide such a signal as shown in FIG. 4H for subsequent application to adder 30. Adder 30 adds the output signal of adder 34 and the inverted signal of the output signal of intermediate value circuit 24 from inverter 32. This means subtraction of the output signal (FIG. 4G) of intermediate value circuit 24 from the output signal (FIG. 4H) of adder 34. Thus the chrominance signal can be obtained from output terminal 36 as shown in FIG. 4I.

The chrominance signal is applied to adder 12 to be added to the output signal (FIG. 4B) of 1H-delay circuit 14. As a result, the chrominance signal is cancelled out to provide the luminance signal as shown in FIG. 4J.

According to the first embodiment described above, therefore, only the chrominance signal can be eliminated without eliminating the high-frequency components of the luminance signal and the luminance signal and the chrominance signal can be completely separated even if there is no correlation between the composite color signals before and after 1H delay.

Figure 5:
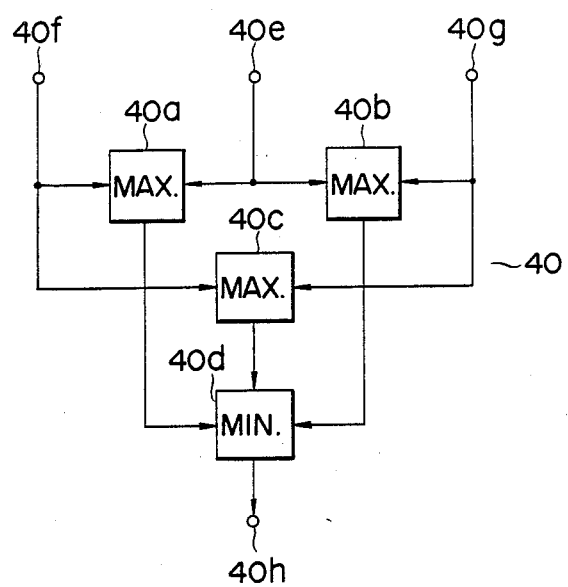
FIG. 5 shows a modification of the intermediate value circuit of FIG. 3.

FIG. 5 shows intermediate value circuit 40 which is different in arrangement from intermediate value circuits 16 and 24. That is, intermediate value circuit 40 is comprised of three maximum value (MAX.) circuits 40a, 40b, and 40c and a minimum value (MIN.) circuit 40d. As is the case with intermediate value circuits 16, 24, intermediate value circuit 40 also derives components which have the same waveform at the same time, from signals applied to input terminals 40f and 40g, when control terminal 40e is set such that AC=0, and apply them to output terminal 40h. Therefore, one or both of the intermediate value circuits 16 and 24 can be replaced with intermediate value circuit 40 for subsequent separation of the luminance signal and the chrominance signal.

Figure 6:
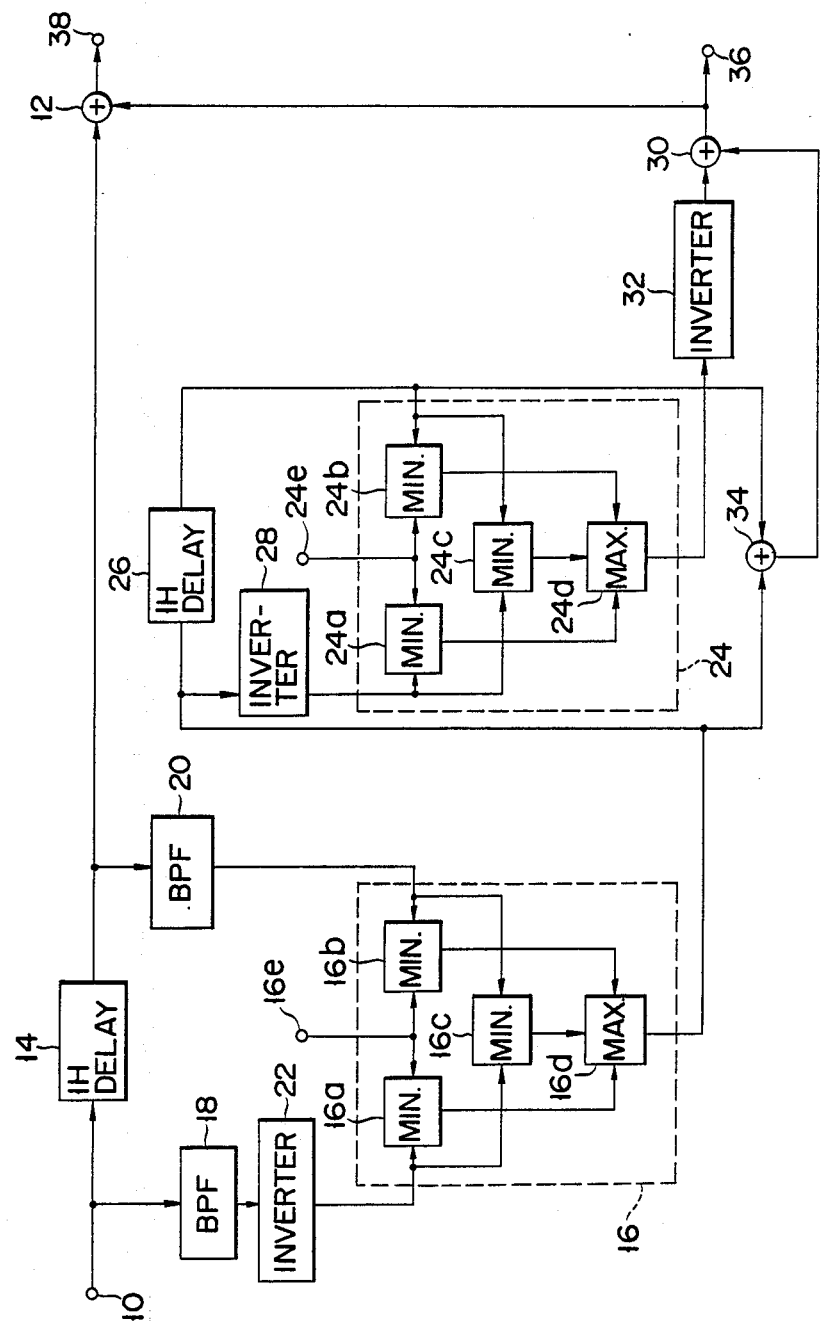
FIG. 6 is a block diagram of a luminance and chrominance signal separation circuit according to a second embodiment of the present invention.

Since intermediate value circuits 16, 24, and 40 are bisymmetrical, the signals applied to the input terminals may be interchanged. FIG. 6 shows a second embodiment of the invention in which the input signals are interchanged. That is, the output of BPF 18 is applied to intermediate value circuit 16 via inverter 22, and the output of intermediate value circuit 16 is applied to intermediate value circuit 24 via inverter 28.

FIG. 7 shows a third embodiment of the invention in which like reference numerals are used to designate corresponding parts in FIG. 3. Signal waveforms appearing at points A through M in FIG. 7 are shown in FIGS. 8A through 8M, respectively. In this embodiment, inverters 22 and 28 of FIG. 3 are omitted and the output signals of BPF 20 and 1H delay circuit 26 are directly applied to intermediate value circuits 16 and 24, respectively.

In this case, the output signal (FIG. 8J) of adder 30 is added to the output signal (FIG. 8E) of inverter 44 for inverting the output signal (FIG. 8D) of BPF 20. In other words, the output signal (FIG. 8D) is subtracted from the output signal (FIG. 8J) of adder 30 to provide the chrominance signal (FIG. 8M) to output terminal 36.

Moreover, the output signal (FIG. 8B) of 1H delay circuit 14 is added in adder 46 to the output signal (FIG. 8E) of inverter 44 for inverting the output signal (FIG. 8D) of BPF 20. In other words, the output signal (FIG.

8D) of BPF 20 is subtracted from the output signal (FIG. 8B) of 1H delay circuit 14. The signal (FIG. 8K) resulting from the subtraction is added to the output signal (FIG. 8J) of adder 30 in adder 12 so that the luminance signal (FIG. 8L) is taken from output terminal 38.

Thus, the embodiment of FIG. 7 can also provide the same advantage as the first embodiment.

Although the preferred embodiments of the present invention have been disclosed and described, it is apparent that other embodiments and modifications are possible.

What is claimed is:

1. A circuit for separating a luminance signal and a chrominance signal from a composite color television signal supplied to an input terminal and outputting the luminance and chrominance signals, comprising:
   first delay means for delaying the composite color television signal supplied to said input terminal by one horizontal line period;
   first extracting means for extracting frequency components in the vicinity of a color subcarrier frequency from the composite color television signal supplied to said input terminal;
   second extracting means for extracting frequency components in the vicinity of the color subcarrier frequency from an output signal of said first delay means;
   first waveform selecting mean connected to receive a first signal obtained by inverting one of the output signals of said first and second extracting means and a second signal corresponding to another output signal of said first and second extracting means, for extracting only those components of the first and second signals which have the same waveform at the same time;
   second delay means for delaying an output signal of said first waveform selecting means by one horizontal line time;
   second waveform selecting means connected to receive a third signal obtained by inverting one of the output signals of said first waveform selecting means and said second delay means and a fourth signal corresponding to another output signal of said first waveform selecting means and said second delay means, for extracting only those components of the third and fourth signals which have the same waveform at the same time;
   adder means for adding the third and fourth signals;
   first signal synthesizing means for performing subtraction between the output signal of said second waveform selecting means and the output signal of said adder means to provide the chrominance signal; and
   second signal synthesizing means for adding the output signal of said first signal synthesizing means and the output signal of said first delay means to provide the luminance signal.

2. The circuit according to claim 1, wherein said first waveform selecting means includes:
   first inverting means for inverting one of the output signals of said first and second extracting means to provide the first signal; and
   first intermediate value circuit means connected to receive the first signal and the second signal for outputting components of the first and second signals which become the same waveform simultaneously.

3. The circuit according to claim 2, wherein said first intermediate value circuit means includes:
   a first input terminal for receiving the first signal;
   a second input terminal for receiving the second signal;
   a control input terminal for receiving a control signal whose alternating current component is zero;
   a first minimum value circuit connected to receive the first signal supplied to said first input terminal and the control signal supplied to said control terminal for selectively outputting a lower level of the first signal and the control signal;
   a second minimum value circuit connected to receive the second signal supplied to said second input terminal and the control signal supplied to said control terminal for selectively outputting a lower level of the second signal and the control signal;
   a third minimum value circuit connected to receive the first signal supplied to said first input terminal and the second signal supplied to said second input terminal for selectively outputting a lower level of the first and second signals; and
   a maximum value circuit connected to receive output signals of said first through third minimum value circuits for selectively outputting the highest level of the output signals.

4. The circuit according to claim 2, wherein said first intermediate value circuit means includes:
   a first input terminal for receiving the first signal;
   a second input terminal for receiving the second signal;
   a control input terminal for receiving a control signal whose alternating current component is zero;
   a first maximum value circuit connected to receive the first signal supplied to said first input terminal and the control signal supplied to said control terminal for selectively outputting a higher level of the first signal and the control signal;
   a second maximum value circuit connected to receive the second signal supplied to said second input terminal and the control signal supplied to said control terminal for selectively outputting a higher level of the second signal and the control signal;
   a third maximum value circuit connected to receive the first signal supplied to said first input terminal and the second signal supplied to said second input terminal for selectively outputting a higher level of the first and second signals; and
   a minimum value circuit connected to receive output signals of said first through third maximum value circuits for selectively outputting the lowest level of the output signals.

5. The circuit according to claim 2, wherein said second waveform selecting means includes:
   second inverting means for inverting one of the output signals of said first waveform selecting means and said second delay means to provide the third signal; and
   second intermediate value circuit means connected to receive the third signal and the fourth signal for outputting components of the third and fourth signals which become the same waveform simultaneously.

6. The circuit according to claim 5, wherein said second intermediate value circuit means includes:
   a first input terminal for receiving the third signal;
   a second input terminal for receiving the fourth signal;

a control input terminal for receiving a control signal whose alternating current component is zero;

a first minimum value circuit connected to receive the third signal supplied to said first input terminal and the control signal supplied to said control terminal for selectively outputting a lower level of the third signal and the control signal;

a second minimum value circuit connected to receive the fourth signal supplied to said second input terminal and the control signal supplied to said control terminal for selectively outputting a lower level of the fourth signal and the control signal;

a third minimum value circuit connected to receive the third signal supplied to said first input terminal and the fourth signal supplied to said second input terminal for selectively outputting a lower level of the third and fourth signals; and a maximum value circuit connected to receive output signals of said first through third minimum value circuits for selectively outputting the highest level of the output signals.

7. The circuit according to claim 5, wherein said second intermediate value circuit means includes:

a first input terminal for receiving the third signal;

a second input terminal for receiving the fourth signal;

a control input terminal for receiving a control signal whose alternating current component is zero;

a first maximum value circuit connected to receive the third signal supplied to said first input terminal and the control signal supplied to said control terminal for selectively outputting a higher level of the third signal and the control signal;

a second maximum value circuit connected to receive the fourth signal supplied to said second input terminal and the control signal supplied to said control terminal for selectively outputting a higher level of the fourth signal and the control signal;

a third maximum value circuit connected to receive the third signal supplied to said first input terminal and the fourth signal supplied to said second input terminal for selectively outputting a higher level of the third and fourth signals; and a minimum value circuit connected to receive output signals of said first through third maximum value circuits for selectively outputting the lowest level of the output signals.

8. The circuit according to claim 1, wherein said first signal synthesizing means includes:

inverting means for inverting the output signal of said second waveform selecting means; and adder circuit means for adding an output signal of said inverting means to the output signal of said adder means.

9. A circuit for separating a luminance signal and a chrominance signal from a composite color television signal supplied to an input terminal and outputting the luminance and chrominance signals, comprising:

first delay means for delaying the composite color television signal supplied to said input terminal by one horizontal line period;

first extracting means for extracting frequency components in the vicinity of a color subcarrier frequency from the composite color television signal supplied to said input terminal to provide a first signal;

second extracting means for extracting frequency components in the vicinity of the color subcarrier frequency from an output signal of said first delay means to provide a second signal;

first waveform selecting means connected to receive the first and second signals from said first and second extracting means, for extracting only these components of the first and second signals which have the same waveform at the same time, providing a third signal;

second delay means for delaying the third signal from said first waveform selecting means by one horizontal line time, to provide a fourth signal;

second waveform selecting means connected to receive the third signal from said first waveform selecting means and the fourth signal from said second delay means for extracting only those components of the third and fourth signals which have the same waveform at the same time;

adder means for adding the third and fourth signals;

first subtracting means for performing subtraction between output signals of said second waveform selecting means and said adder means;

second subtracting means for performing subtraction between the output signal of said first delay means and the output signal of said second extracting means;

first signal synthesizing means for performing subtraction between the output signal of said first subtracting means and the second signal from said second extracting means, to provide the chrominance signal; and second signal synthesizing means for adding the output signal of said first subtracting means and an output signal of said second subtracting means, to provide the luminance signal.

10. The circuit according to claim 9, wherein said first waveform selecting means includes:

a first input terminal for receiving the first signal;

a second input terminal for receiving the second signal;

a control input terminal for receiving a control signal whose alternating current component is zero;

a first minimum value circuit connected to receive the first signal supplied to said first input terminal and the control signal supplied to said control terminal for selectively outputting a lower level of the first signal and the control signal;

a second minimum value circuit connected to receive the second signal supplied to said second input terminal and the control signal supplied to said control terminal for selectively outputting a lower level of the second signal and the control signal;

a third minimum value circuit connected to receive the first signal supplied to said first input terminal and the second signal supplied to said second input terminal for selectively outputting a lower level of the first and second signals; and a maximum value circuit connected to receive output signals of said first through third minimum value circuits for selectively outputting the highest level of the output signals.

11. The circuit according to claim 9, wherein said first waveform selecting means includes:

a first input terminal for receiving the first signal;

a second input terminal for receiving the second signal;

a control input terminal for receiving a control signal whose alternating current component is zero;

a first maximum value circuit connected to receive the first signal supplied to said first input terminal and the control signal supplied to said control terminal for selectively outputting a higher level of the first signal and the control signal;

a second maximum value circuit connected to receive the second signal supplied to said second input terminal and the control signal supplied to said control terminal for selectively outputting a higher level of the second signal and the control signal;

a third maximum value circuit connected to receive the first signal supplied to said first input terminal and the second signal supplied to said second input terminal for selectively outputting a higher level of the first and second signals; and a minimum value circuit connected to receive output signals of said first through third maximum value circuits for selectively outputting the lowest level of the output signals.

12. The circuit according to claim 9, wherein said second intermediate value circuit means includes:

a first input terminal for receiving the third signal;

a second input terminal for receiving the fourth signal;

a control input terminal for receiving a control signal whose alternating current component is zero;

a first minimum value circuit connected to receive the third signal supplied to said first input terminal and the control signal supplied to said control terminal for selectively outputting a lower level of the third signal and the control signal;

a second minimum value circuit connected to receive the fourth signal supplied to said second input terminal and the control signal supplied to said control terminal for selectively outputting a lower level of the fourth signal and the control signal;

a third minimum value circuit connected to receive the third signal supplied to said first input terminal and the fourth signal supplied to said second input terminal for selectively outputting a lower level of the third and fourth signals; and a maximum value circuit connected to receive output signals of said first through third minimum value circuits for selectively outputting the highest level of the output signals.

13. The circuit according to claim 9, wherein said second intermediate value circuit means includes:

a first input terminal for receiving the third signal;

a second input terminal for receiving the fourth signal;

a control input terminal for receiving a control signal whose alternating current component is zero;

a first maximum value circuit connected to receive the third signal supplied to said first input terminal and the control signal supplied to said control terminal for selectively outputting a higher level of the third signal and the control signal;

a second maximum value circuit connected to receive the fourth signal supplied to said second input terminal and the control signal supplied to said control terminal for selectively outputting a higher level of the fourth signal and the control signal;

a third maximum value circuit connected to receive the third signal supplied to said first input terminal and the fourth signal supplied to said second input terminal for selectively outputting a higher level of the third and fourth signals; and a minimum value circuit connected to receive output signals of said first through third maximum value circuits for selectively outputting the lowest level of the output signals.

14. The circuit according to claim 9, wherein said first subtracting means includes:

inverting means for inverting the output signal of said second waveform selecting means; and adder circuit means for adding an output signal of said inverting means and the output signal of said adder means.

15. The circuit according to claim 9, wherein said second subtracting means includes:

inverting means for inverting the second signal of said second extracting means; and adder circuit means for adding an output signal of said inverting means to the output signal of said first delay means.

16. The circuit according to claim 9, wherein said first signal synthesizing means includes:

inverting means for inverting the second signal from said second extracting means; and adder circuit means for adding an output signal of said inverting means to the output signal of said first subtracting means.

* * * * *